Patented July 10, 1928.

1,676,862

UNITED STATES PATENT OFFICE.

ALFRED HÄUSSLER, OF NIEDER-INGELHEIM-ON-THE-RHINE, GERMANY, ASSIGNOR TO C. H. BOEHRINGER SOHN, CHEMISCHE FABRIK, OF NIEDER-INGELHEIM-ON-THE-RHINE, GERMANY, A FIRM.

PROCESS FOR THE PRODUCTION OF QUINOLINE-4-CARBOXYLIC ACIDS.

No Drawing. Application filed December 8, 1926, Serial No. 153,454, and in Germany February 6, 1926.

It is known to produce 2-phenylquinoline-4-carboxylic acid by bringing equal molecules of pyroracemic acid, benzaldehyde and aniline into reaction in alcoholic solution. It is furthermore known to produce first of all the condensation product of aniline and benzaldehyde and to introduce pyroracemic acid gradually into a boiling alcoholic solution thereof, about 1 molecule of pyroracemic acid being employed per 1 part of the condensation product.

It has now been found that surprising increases of yield, together with other advantages, are achieved by employing more than 1.5 molecules of the condensation product (benzylidene-aniline), for example 1.5 to 2 molecules per 1 molecule of pyroracemic acid.

The invention may be carried into practice by, for example, adding 1 molecule of pyroracemic acid, by itself or, for example, in alcoholic or aqueous solution, to a hot alcoholic solution of 1.6 to 1.8 molecules of benzylidene-aniline and by then subjecting the reaction-mixture to a subsequent heating, if necessary.

Comparative experiments, in which 1 molecule of pyroracemic acid was brought into reaction with 1 molecule, 1.3 molecules, 1.5 molecules and 1.75 molecules of benzylidene-aniline, gave yields of 50%, 65%, 75% and 80% of the theoretical yield of 2-phenylquinoline-4-carboxylic acid. The possibility of obtaining yields of 75–80% and more when working according to the invention indicates undoubtedly an important addition to the art, particularly in view of the considerable value of the end product.

Further investigations have shown that quite generally optimum yields are obtained in the producton of quinoline-4-carboxylic acids substituted in the second position by aryl or alkyl radicals if the condensation product from an aromatic amine and aldehyde is employed in considerable excess as compared with the pyroracemic acid or a substitution product of the pyroracemic acid, for example, in such a manner that more than 1.5 molecules, preferably, for example, about 1.5 to 2 molecules, of the condensation product are employed per 1 molecule of pyroracemic acid. The quantity of condensation product to be added over and above the limiting value of 1.5 molecules naturally depends, from case to case, on the increase of yield which can be achieved by the increase in the amount added.

Examples.

1. 18.6 grms. of aniline and 21.2 grms. of benzaldehyde are boiled in 400 c. c. of alcohol for 1 hour under reflux. A solution of 8.8 grms. of pyroracemic acid in 50 c. c. of alcohol is then added and the boiling with reflux is continued for a further 1 to 2 hours. The separation of the 2-phenylquinoline-4-carboxylic acid is effected in the usual manner. The product has the formula:

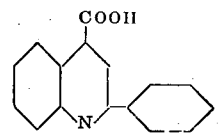

The reaction probably takes place according to the equation:

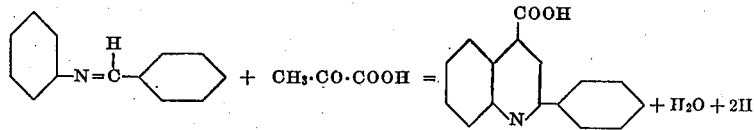

2. 88 parts by weight of a 50% aqueous solution of pyroracemic acid are added to a boiling alcoholic solution of 155 parts by weight of benzylidene-aniline and boiling under reflux is continued for a further three hours. After the main quantity of the alcohol has been distilled off the greater part of the phenylquinoline carboxylic acid formed crystallizes out. A further quantity of the phenylquinoline carboxylic acid may be recovered from the mother liquor by further concentration and crystallization or by solution of the evaporated residue in ether or benzol under agitation with caustic soda solution.

3. 28.6 grms. of β-naphthylamine (2 molecules) and 21.2 grms. of benzaldehyde (2 molecules) are dissolved in 400 c. c. of 95% ethyl alcohol and boiled for 1 hour under a reflux condenser. 8.8 grms. of 100% pyroracemic acid (1 molecule) dissolved in 100 c. c. of alcohol are then added slowly to the boiling solution and the heating continued for a further short while. Even during the reaction and subsequently on cooling the 2-phenyl-naphthoquinoline-4-carboxylic acid, difficultly soluble in alcohol, separates out. Yield, 95–100% of the theoretical (with reference to the pyroracemic acid introduced). The product has the probable formula:

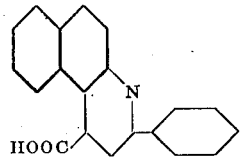

If only 1 molecule of β-naphthylamine and 1 molecule of benzaldehyde is added per 1 molecule of pyroracemic acid, a yield of 52% only of the theoretical is obtained.

4. 22.5 grms. (1 molecule) of condensation product from p-toluidine and anisic aldehyde are dissolved in 150 c.c. of alcohol. 5.5 grms. of 80% pyroracemic acid (half a molecule) are added to the boiling solution and boiling is effected for 2 to 3 hours under the reflux condenser. 2-p-methoxyphenyl-6-methyl-quinoline-4-carboxylic acid forms with a yield of about three times the weight of the pyroracemic acid added. The product has the formula:

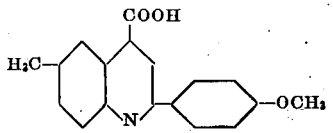

If 1 molecule of condensation product from p-toluidine and anisic aldehyde is employed per 1 molecule of pyroracemic acid, the yield only amounts to 1.5 times the weight of pyroracemic acid.

What I claim is:—

1. A process for the production of quinoline-4-carboxylic acids aryl-substituted in the second position, which consists in causing 1 molecule of pyroracemic acid to react, in the presence of a solvent, with more than 1.5 molecules of a condensation product from an aromatic amine and an aromatic aldehyde.

2. A process for the production of quinoline-4-carboxylic acids aryl-substituted in the second position, which consists in causing 1 molecule of pyroracemic acid to react, in the presence of a solvent, with from 1.5 to 2 molecules of a condensation product from aromatic amine and aromatic aldehyde.

3. A process for the production of 2-phenyl-quinoline-4-carboxylic acid, which consists in causing 1 molecule of pyroracemic acid to react, in the presence of alcohol, with more than 1.5 molecules of benzylidene-aniline.

4. A process for the production of 2-phenyl-quinoline-4-carboxylic acid, which consists in causing 1 molecule of pyroracemic acid to react, in the presence of alcohol, with from 1.5 to 2 molecules of benzylidene-aniline.

5. A process for the production of 2-phenyl-quinoline-4-carboxylic acid, which consists in causing 1 molecule of pyroracemic acid to react, in the presence of alcohol, with about 2 molecules of benzylidene-aniline.

In testimony whereof I affix my signature.

ALFRED HÄUSSLER.